No. 851,268. PATENTED APR. 23, 1907.
J. H. WAY.
COLLAR PROTECTOR.
APPLICATION FILED MAR. 3, 1905.
FIG. I.
FIG. II.
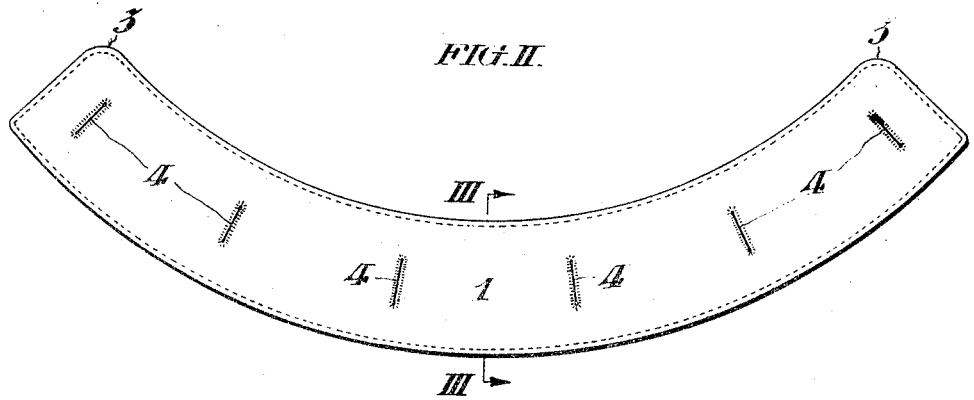
FIG. III.
WITNESSES:
Clifton C. Hallowell
John C. Bergner
INVENTOR:
JOHN H. WAY,
by his attorneys
Paige Paul & Freely

UNITED STATES PATENT OFFICE.

JOHN H. WAY, OF PHILADELPHIA, PENNSYLVANIA.

COLLAR-PROTECTOR.

No. 851,268.  Specification of Letters Patent.  Patented April 23, 1907.

Application filed March 3, 1905. Serial No. 248,204.

*To all whom it may concern:*

Be it known that I, JOHN HOWARD WAY, of Philadelphia, in the State of Pennsylvania, have invented certain new and useful Improvements in Collar-Protectors, of which the following is a specification, reference being had to the accompanying drawings.

My invention relates to a device, which I term a collar protector, and which has for its object to prevent the ordinary starched shirt collar from being soiled by contact with the inside of the collar of the coat which may be used by the wearer of the collar.

To this end, my invention consists of a suitably shaped protector, made of some clean soft self-sustaining material, detachably secured to the inner side of the coat collar, of such height that its edge interposes itself directly between the edge of the coat collar and the surface of the starched collar which it is to protect, while at the same time the extent of this projection is preferably so slight as to be inconspicuous, and of such length as to nearly but not quite surround the neck of the wearer with provision of a space between its ends proportionate to the opening between the lapels of the coat collar.

I have shown in the accompanying drawings, a protector constructed so as to embody my invention.

Figure I, represents the head and shoulders of a man wearing an coat provided with my collar protector. Fig. II, represents the collar protector when detached from the coat. Fig. III, is a transverse sectional view of the same taken on the line III, III, in Fig. II.

My protector 1, is in the general shape of a partial annulus. It is preferably made of a double thickness of fine white duck or some other clean and soft self-sustaining material. For this purpose two pieces of suitable material may be cut in the shape of Fig. II, but with sufficient margin, and then be united by a seam along their edges with the infolding of a welt from each piece as clearly shown at 2, 2, in Fig. III. By thus providing a double welt and seam along the edge I secure considerable stiffening of the edge of the protector without the use of starch, and at the same time a very neat and attractive appearance.

The length of the collar protector is proportionate to the size of the wearer and should be such as to entirely pass around the shirt collar, leaving a space in front properly proportionate to the opening between the lapels of the coat collar. In this way the ends of the protector are sufficiently parted to prevent them from covering the neck-tie of the wearer.

The upper corners of the two ends of the collar protector are curved as seen at 3, 3, so as to increase the space between these corners, when the protector is in place, thereby rendering it more inconspicuous and less likely to overlap the neck-tie, although not in any wise interfering with the function of the protector to prevent the collar of the coat from soiling the shirt collar.

At suitable intervals along the protector are inserted button holes 4, 4. The coat to which the protector is to be applied has affixed to the inner side of the collar a series of buttons corresponding in position to the button holes 4, 4, by means of which the protector is attached to the coat.

In depth the protector is such that its upper edge projects but a short distance, say about one-quarter of an inch above the edge of the coat collar, as seen at 5, in Fig. I. This is just enough to cause the edge of the protector to be effectually interposed between the shirt collar and the coat collar of the wearer, while at the same time preventing it from being conspicuous.

By the use of my collar protector, the shirt collar of the wearer is fully protected from soiling, by reason of the rubbing of the inner collar of the coat against the shirt collar. At the same time my invention presents an exceedingly neat and dressy appearance.

The article can be easily taken off and washed or replaced.

I am aware that collar protectors have previously been made suitable for attachment within the collar of an overcoat, but heretofore they have been made so long as to overlap in front at the point where the lapels of the coat cross. The projecting ends thus overlapped are objectionable not only because when the coat is unbuttoned they present an untidy appearance and make the protector unduly conspicuous, but also because they tend to hide the neck-tie of the wearer of the coat. My invention differs from these heretofore used protectors in that the entire protecting function of the article is retained while the objections which I have referred to are overcome.

Having thus described my invention, I claim:

A collar protector in the shape of a partial annulus of soft but self-sustaining material provided with means for detachably securing the same to the inner side of a coat collar, the upper corners of the partial annulus being curved, its length being such as to surround the collar of the wearer without passing across the neck-tie and its height such as to interpose its upper edge between the coat collar and the shirt collar of the wearer, with provision between its curved ends of a space substantially equal to that between the opposed edges of an ordinary collar.

In testimony whereof, I have hereunto signed my name, at Philadelphia, Pennsylvania, this second day of March 1905.

JOHN H. WAY.

Witnesses:
JAMES H. BELL,
E. L. FULLERTON.